United States Patent Office 3,294,486
Patented Dec. 27, 1966

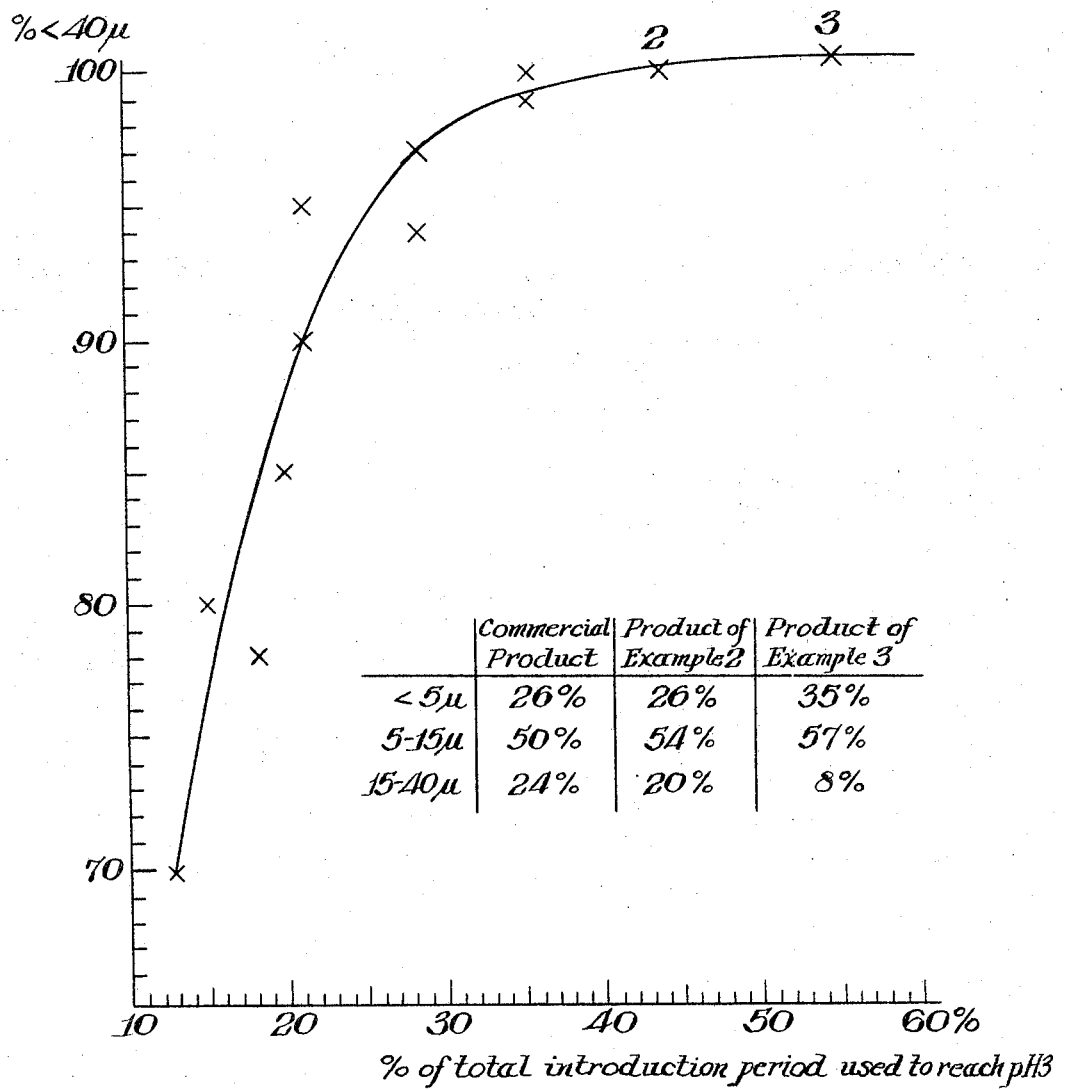

3,294,486
MANUFACTURE OF DICALCIUM PHOSPHATE, DIHYDRATE
Joseph Cremer, Hermulheim, near Cologne, and Heinz Harnisch, Lovenich, near Cologne, Germany, assignors to Knapsack Aktiengesellschaft, a corporation of Germany
Filed Sept. 15, 1964, Ser. No. 396,483
Claims priority, application Germany, Sept. 16, 1963,
K 50,836; Sept. 28, 1963, K 50,945; Aug. 8, 1964,
K 53,700
10 Claims. (Cl. 23—109)

The present invention is concerned with a process for the manufacture of dicalcium phosphate dihydrate from a calcium compound, phosphoric acid and/or a phosphoric acid salt and optionally a basic compound in the presence of water.

The manufacture of dicalcium phosphate dihydrate by a conventional method e.g. of the type wherein calcium carbonate or hydroxide is added to dilute phosphoric acid, leads to products which substantially have a grain size above 40μ after drying. The final product obtained must be ground so as to adjust a given grain size and so as to obtain a given degree of grain distribution. Grinding to so small a grain size is very expensive and requires much energy. Furthermore, each grinding operation is often associated with a strong change of the initial grain shape. Especially in the preparation of very white dicalcium phosphate dihydrate containing 99% granular matter having a grain size smaller than 40μ for use as a cleaning agent in tooth pastes, it is very desirable to obviate the comminuting step or to comminute the material within a fairly short period of time and under fairly mild conditions because each grinding step will produce small amounts of abrasion fines which may impair the degree of whiteness and the purity of the product.

The present invention unexpectedly provides a process for making dicalcium phosphate dihydrate having a given grain size and a given degree of grain size distribution from a calcium compound, phosphoric acid and/or a phosphoric acid salt and optionally a basic compound in the presence of water, wherein at least the feed components influencing the pH-value of the resulting reaction mixture are reacted with each other by being mixed concurrently and in a quantitative ratio so as to obtain a certain pH-value or pH-range of 2.0 and 6.0, preferably 2.5 and 5.0, which is maintained, the reaction being carried out at a higher pH-value within the range specified above when smaller grain sizes are intended to be obtained. Short time treatment outside the pH-values specified above but within the limits of pH 1.5 to 9.0 does not interfere with the reaction. For example, grain sizes substantially within the range of 5 to 40μ will be obtained when the reaction is allowed to proceed at a pH-value of about 3, and grain sizes smaller than 15μ will be obtained when the reaction is allowed to proceed at a pH-value of 5.

In discontinuous operation, the reaction is started with the introduction of the feed product portion of neutral reaction followed by the addition of the other reaction components, the pH-range to be bridged until obtainment of the necessary pH-value being traversed during this addition. Thus, for example, the diluting water or calcium chloride solution having a pH-value of 6 to 8 and first introduced into a reaction zone can be treated so as to fairly rapidly adjust a pH-value of approximately 3, preferably 2.5 to 3.5. If, however, related to the whole introduction time of the feed products, relatively long time is allowed to lapse for reducing a pH-value of 6 to 8 to approximately 3 or, in other words, if more time than e.g. 30% of the whole reaction time is needed to traverse the pH-range of about 7 down to pH 3, i.e. by the retarded addition of phosphoric acid, then the grain size distribution of the resulting dicalcium phosphate will change as indicated in the accompanying diagram.

The diagram indicates that within an introduction time period of 10 to 60% the proportion of grains smaller than 40μ will increase from 70 to 100%. Furthermore, Example 2 below will show in comparison with the degree of grain distribution in a commercial product that such degree of grain distribution can be substantially obtained without grinding by specific precipitating conditions alone. Example 3 below illustrates that in a product containing more than 99% granular matter with grains smaller than 40μ the fine grain portion corresponding to a grain size smaller than 5μ can even be increased at the expense of the coarser grain portion having a grain size range of 15 to 40μ. It is obvious that such treatment will preserve the grain shape of precipitated dicalcium phosphate, which is obtained, e.g. in the form of disk-like crystals having new utilitarian properties, e.g. a low bulk or shake density. In other words the light weight quality of the product is preserved.

For continuous operation, the feed components are mixed so as to obtain a constant pH-value. For example, the feed substances are fed concurrently and after adjustment of the desired pH-value are fed in substantially stoichiometric proportions, related to the general ion equation:

$$3H^+ + PO_4^{---} + Ca^{++} + 2OH^- \rightarrow CaHPO_4 \cdot 2H_2O$$

into a reactor with intense mixing. In a series-connected second reactor having a stirring means, the suspension passing through said second reactor is adjusted to a pH-value of between 6.0 to 8.0, preferably 6.5 to 7.5.

These conditions also enable the degree of grain size distribution to be influenced as desired by carrying out the precipitating reaction in the first reactor at a fairly constant pH-value which is preferably within the range of 2.5 to 5.0. The following Table 1 indicates the degree of grain size distribution obtainable as a function of the respective constant pH-value.

TABLE 1

| pH | Grain size distribution | | | | |
|---|---|---|---|---|---|
| | <40μ | <5μ | 5–15μ | 15–40μ | >40μ |
| 2.5 | 70% | | | | |
| 3.0 | 87% | 17% | 30% | 40% | 13% |
| 3.5 | 93% | | | | |
| 4.0 | 99% | 32% | 55% | 13% | 0% |
| 4.5 | 99% | | | | |
| 5.0 | 99% | 40% | 57% | 3% (<30μ) | 0% |

The numerical values indicated in the accompanying diagram and in Table 1 above as regards the degree of grain size distribution as a function of the pH-value were determined at a mean stirring intensity (1000–2000 revolutions per minute). It is obvious that very high-speed stirring systems rotating e.g. at a speed of 4000 to 5000 r.p.m. may result in the whole grain size being shifted in favor of smaller grain sizes due to mechanical comminution of the crystals.

This latter procedure also enables in continuous operation the production firstly of dicalcium phosphate containing up to about 50% granular material having a grain size greater than 40μ and secondly enables the proportion of grains having a size smaller than 5μ to be remarkably increased in commercial dicalcium phosphate preparations containing 99% granular material having a grain size smaller than 40μ. Obviously, a certain constant pH-value can also be maintained in discontinuous operation.

The reaction should be carried out at a temperature below about 70° C. because products free from water of crystallization will increasingly be formed above this temperature with increasing temperatures.

In order to prepare very pure and very white dicalcium phosphate dihydrate it is necessary to use corresponding high-grade feed products. In addition thereto, the working conditions must be selected so as to obviate the formation of compounds other than the compound mentioned above, i.e. calcium phosphates of different composition, e.g.

$CaHPO_4$, $Ca_3(PO_4)_2 \cdot XH_2O$, $Ca_3(PO_4)_3OH$, $Ca_4H(PO_4)_3$ or the like.

Phosphoric acid prepared from phosphorous obtained by electrothermal means, which is known to be very pure is a suitable feed component. The second feed component is carefully selected mineral calcium carbonate or calcium hydroxide. In order to meet extreme specifications, relatively costly, precipitated calcium carbonates will be used as feed component, or calcium hydroxide will be reduced to the necessary purity by special after-treatment.

The methods conventional for making dicalcium phosphate dihydrate use dilute phosphoric acid as the first feed component which is successively admixed under specific conditions, e.g. narrow temperature, concentration and pH-ranges, with a finely divided suspension of calcium carbonate or hydroxide. Further operational steps comprise a prolonged "ripening" time, decantation, washing and filter treatment.

To stabilize the final product, it is again suspended in water and the resulting aqueous suspension is admixed with a stabilizer e.g. a stabilizer of the condensed phosphate series. Specific conditions have again to be observed, and following a certain time during which the stabilizer is allowed to act on the suspension, the product is again decanted, washed, filtered, dried and ultimately reduced to the desired grain size.

Apart from the many operational steps involved and the relatively costly feed products used in these old methods, they involve the disadvantage of employing precipitated calcium carbonates and hydroxides of different origin which result in the formation of dicalcium phosphates of very varying and relatively limited whiteness immaterial of the almost uniform and high degree of whiteness of the carbonates and hydroxides used for making the dicalcium phosphates. This is ultimately caused by the grain core of the products containing slight and varying amounts of impurities which include colored organic or inorganic substances, e.g. carbon or carbon compounds or vanadium, chromium, manganese and especially iron, cobalt and nickel compounds. Due to their being embedded in the grains these contaminants will not initially influence the degree of whiteness of the carbonate or hydroxide, but they will be liberated on reacting the carbonate or hydroxide with phosphoric acid so as to penetrate to the surface and decide the varying and always markedly lower degree of whiteness of the dicalcium phosphate obtained.

The following Table 2 indicates the whiteness of the dicalcium phosphate as a function of the calcium compounds used as the feed product and as a function of their degree of whiteness. In the following Table 2, columns A and B have the following meanings:

Column A: degree of whiteness of the calcium compound in percent

Column B: degree of whiteness in percent of the dicalcium phosphate dihydrate obtained.

TABLE 2

| Feed product | A | B |
| --- | --- | --- |
| Calcium hydroxide, unpurified + thermal phosphoric acid | 87% | 91.0% |
| Calcium hydroxide, purified + thermal phosphoric acid | 97% | 96.6% |
| Selected mineral limestone + thermal phosphoric acid | 96% | 95.0% |
| Precipitated limestone + thermal phosphoric acid | 98% | 97.0% |
| Calcium chloride + sod. hydr. sol. + thermal phosphoric acid | | 99.0% |
| Calcium nitrate + ammonia + thermal phosphoric acid | | 99.0% |

The degree of whiteness was determined with a spectroscopic photometer Beckmann DU with supplementary reflecting apparatus at 580 mμ related to MgO (as used for analyses; Messrs. Merck) =100%.

The methods customarily used for making dicalcium phosphate dihydrate also involve the disadvantage of permitting but discontinuous operation. Furthermore, they do not obviate with certainty that relatively minor variations from the operative manufacturing conditions or from quality specifications for the feed products may result in the formation of calcium phosphates of different composition and modified properties which in turn may involve considerable utilitarian difficulties. This is especially disadvantageous with products which are intended to meet the steadily increasing demands made on the quality of cosmetics, foodstuffs and medicaments.

It has now unexpectedly been found that the above difficulties can be obviated in the manufacture of very white dicalcium phosphate dihydrate having the formula $CaHPO_4 \cdot 2H_2O$ by using as the feed products a clear aqueous phosphoric acid solution and/or a phosphoric acid salt solution as well as a calcium salt solution and a basic compound solution, e.g. an alkali metal or ammonium hydroxide or carbonate solution, the feed products having a purity greater than 99.90% by weight, preferably greater than 99.95% by weight, and containing less than 0.1% by weight, preferably 0.01% by weight impurifying elements, especially iron, cobalt, nickel, vanadium, chromium and manganese. These feed solutions are rapidly and intimately mixed with one another in substantially stoichiometric proportions related to the general theoretical ion-equation:

$$3H^+ + PO_4^{---} + Ca^{++} + 2OH^- \rightarrow CaHPO_4 \cdot 2H_2O$$

in a reactor, optionally in the presence of additional water. The feed solutions are added to each other so as to maintain during the precipitating reaction a pH-value of between about 2.0 to 6.0, preferably 2.5 to 5.0. After all the phosphoric acid and/or the phosphoric acid salt have been added, the reaction product is adjusted so as to have a pH-value of 6.0 to 8.0, preferably 6.5 to 7.5 by adding the balance portion of the calcium salt solution and/or the basic compound solution. The resulting precipitate is then filtered off in conventional manner and worked up.

The dicalcium phosphate dihydrate can be formed e.g. according to the following reaction equations:

$$CaCl_2 + 2NaOH + H_3PO_4 \rightarrow CaHPO_4 \cdot 2H_2O + 2NaCl \quad (1)$$

$$CaCl_2 + Na_2CO_3 + H_3PO_4 \rightarrow CaHPO_4 \cdot 2H_2O + 2NaCl + CO_2 \quad (2)$$

$$Ca(NO_3)_2 + 2NH_4OH + H_3PO_4 \rightarrow CaHPO_4 \cdot 2H_2O + 2NH_4NO_3 \quad (3)$$

$$KH_2PO_4 + KOH + Ca(NO_3)_2 + H_2O \rightarrow CaHPO_4 \cdot 2H_2O + 2KNO_3 \quad (4)$$

The suitable feed solutions also include those solutions which contain less than 0.1% by weight colored inorganic and/or organic substances e.g. carbon or carbon compounds. The solutions also should contain less than 0.001% by weight or 0.0001% by weight arsenic and lead inasmuch as the intended application of the compound $CaHPO_4.2H_2O$ calls for so low a content of these compounds. Impurities which during the reaction remain dissolved and thus do not appear in the final product but are removed together with the filtrate are not critical.

The reaction should be carried out at a temperature not exceeding 70° C. and which preferably should be situated between 25 and 45° C. This can be achieved firstly by cooling the reactor and which secondly e.g. by cooling at least one of the feed solutions prior to the reaction down to a temperature limit where the feed substances are just prevented from crystallizing out.

Dicalcium phosphate dihydrate intended especially for use in cosmetic or medicinal preparations should be stabilized. The stabilization prevents e.g. tooth pastes from becoming hard and useless during storage due to an undefined reaction between the glycerol contained therein with the dicalcium phosphate.

As opposed to conventional methods, the process of the present invention requires no special steps to be taken for stabilizing, and the stabilization can be effected in combination with the precipitating reaction. The stabilizers which include e.g. tetrasodium pyrophosphate and higher-condensed phosphates, are used in a concentration of 0.25 to 1.5% by weight, related to $CaHPO_4.2H_2O$ and they are introduced into the reactor before the final product is isolated, that is to say before, during or after the reaction and either separately or in admixture with one of the feed solutions.

The calcium compounds serving as the feed products are used e.g. in the form of a solution of calcium chloride or calcium nitrate or in the form of a solution or suspension of calcium hydroxide and/or carbonate; there may also be employed an alkali metal or ammonium hydroxide and/or carbonate solution or an alkali metal or ammonium ortho-phosphate solution. The calcium salt solutions should be used in a concentration of about 35% by weight, the basic compound solution in a concentration of about 50% by weight, and the phosphoric acid in a concentration of about 84% by weight, related to $H_3PO_4$.

The present invention can be carried out as either a continuous or discontinuous process. In either process, it has proved simple and convenient to feed the calcium compound and the basic component concurrently in substantially stoichiometric proportions, related to the above ion-equation. They are fed e.g. with the help of dosing pumps to a reactor provided with a cooling and a stirring means. The phosphoric acid or phosphoric acid salt which is fed concurrently therewith is supplied so as to obtain a pH-range of between about 2 to 6 during the reaction. Short time treatment outside this range e.g. at a pH-value of about 9 does not interfere with the reaction. Finally, it has proved especially advantageous to use a slight excess of hydrogen ions during the precipitating reaction. After all the phosphoric acid and/or phosphoric acid salt has been added, the corresponding portion of so-called free phosphoric acid, which is preferably present in a proportion of less than 15% related to the whole amount of acid, is neutralized by adding e.g. the balance portion of the calcium salt and/or basic compound solution, and the reaction mixture is thereby adjusted to have a pH-value of about 6 to 8, preferably 6.5 to 7.5. Alternatively, in either discontinuous or continuous operation, the calcium salt solution together with the phosphoric acid and/or the phosphoric acid salt solution in appropriate quantitative proportions may be first introduced into the reactor, the final pH-value being then adjusted with the basic compound solution alone. Final pH-adjustment to the above pH-range is obligatory because the stabilization of dicalcium phosphate dihydrate which may be necessary for a given use will then produced especially favorable results.

Diluting water may be introduced separately or concurrently with the feed products into the reactor.

Intense stirring is necessary in order to avoid varying pH-indications and in order to rapidly and completely mix the reaction components with each other. High-speed stirrers are especially suitable for this which permit rotating a certain reaction volume for a certain time and thus produce repeated mechanical mixing with the formation of a vortex into which the reaction components may be introduced. Constant pH-indication and mixing times smaller than 1 second can be realized in this manner.

When phosphoric acid salts are used, the basic compound proportion may be reduced beyond the stoichiometric ratio and the proportion of cations in the salt may be increased concurrently therewith e.g. by using a corresponding proportion of potassium diphosphate. This procedure is limited by the pH-range to be observed.

In view of the fact that the reaction components may act upon one another during any moment in the quantitative ratio and pH-range most favorable for the formation of $CaHPO_4.2H_2O$, it is almost impossible that calcium phosphates of different composition do form. The influence exerted by these factors is illustrated by the fact that the old processes can be markedly improved by the mere concurrent mixing of conventional feed products such as $CaCO_3$ or $Ca(OH)_2$ in solid form with phosphoric acid in about stoichiometric proportions.

Improved results, especially as regards the degree of whiteness are, however, obtained with the use of a solution. The advantage is that "ripening" time is necessary because in contrast to old processes the insoluble dicalcium phosphate component is obtained immediately from soluble feed products. Factors which are substantially a function of time in solid substance reactions, e.g. the diffusion velocity therefore need not be considered. Ion-reactions, especially neutralization reactions, are known to proceed at a very high rate which therefore permit in the present process very high throughputs to be obtained or small reactor volumes to be applied, especially in continuous operation.

A still further advantage offered by the present invention would appear to reside in the fact that the solutions used as feed can be obtained as secondary or by-products of other processes, i.e. in the form of clear solutions which are free from annoying impurities and have concentrations so as to be useful in the present process without further treatment. In other words, preparation or work-up are not necessary.

Calcium chloride solutions and calcium carbonate are primarily used as the source supplying the calcium necessary for carrying out the present process. It may, however, turn out disadvantageous to use either one or the other of these two substances as the feed product.

The use of calcium chloride solutions in combination with the alkali metal or ammonium hydroxide, e.g. sodium hydroxide solution, necessary in this case will result in the formation of equivalent proportions of alkali metal or ammonium chloride, e.g. sodium chloride, which especially in the case of large production facilities considerably increase the salt content of the waste water which therefore must be subjected to special waste water treatment.

No such problems are involved when calcium carbonate is the feed product, but no carbonate-free final product can then be obtained because the pH-value of the reaction mixture will increase towards the end of the reaction so as to render quantitative conversion of the calcium carbonate and complete expelling of the resulting $CO_2$ impossible.

These difficulties can be obviated by causing the bulk, i.e. about 80 to 85% by weight of the calcium compound feed, i.e. in the form of calcium carbonate, to react at low pH-values and by causing the balance portion thereof in the form of a calcium salt solution, e.g. a $CaCl_2$ or $Ca(NO_3)_2$-solution in combination with an equivalent proportion of an alkali metal or ammonium hydroxide, e.g. sodium hydroxide solution, to react at a higher pH-value. Carbonate-free dicalcium phosphate will then be obtained, and the amount of resulting alkali metal or ammonium salt will be reduced to a tolerable minimum.

This method for making dicalcium phosphate containing 40 to 70% granular matter having a grain size greater than 40µ comprises more especially causing about 80 to 85% by weight of the total calcium amount in the form of water-suspended calcium carbonate to run concurrently with phosphoric acid with rapid and intimate mixing into a reactor, the two components being fed in a quantitative ratio so as to maintain a pH-value of about 2 to 4, preferably 2.4 to 3.2, optimum results being obtained at a pH-value of about 2.4 to 2.6. After all has been added and after completion of the reaction, the calcium balance portion in the form of a calcium salt solution, e.g. a calcium chloride or nitrate solution, and the alkali metal or ammonium hydroxide, e.g. sodium hydroxide solution, are added in stoichiometric proportions, related to the reaction equation:

$$CaCl_2 + 2NaOH + H_3PO_4 \rightarrow CaHPO_4.2H_2O + 2NaCl$$

until obtainment of a pH-value of about 8 to 9, preferably 8.2 to 8.6. The product so prepared has a very stable pH-value and is extremely white. The dicalcium phosphate so produced contains, however, 40 to 70% granular matter with a grain size greater than 40µ or inversely as much as 30 to 60% granular matter having a grain size smaller than 40µ.

If, after all has been added, the pH-value of the reaction mixture has dropped to about 7.0 to 7.5, the dicalcium phosphate crystallized out is separated from its mother liquor. For stabilizing the dicalcium phosphate, it is admixed during the addition e.g. of calcium chloride and sodium hydroxide solution and as soon as a pH-value of about 5 has been reached with a stabilizer which is applied in a proportion of about 0.6 to 0.8% by weight, related to the final product. Appropriate stabilizers include disodium metasilicate, disodium tetraborate, tetrasodium pyrophosphate, magnesium pyrophosphate, sodium tripolyphosphate and the like.

The calcium carbonate suspension should preferably have a density of about 1.46, and the suspended calcium carbonate should contain not more than 80% granular matter having a grain size greater than 60µ, preferably 80% grains having a size greater than 40µ, e.g. a maximum of 70% grains greater than 40µ. In order to produce a very white final product, it is advantageous to use calcium carbonate having at least a 97% degree of whiteness, related to MgO as used for analyses (Messrs. Merck). It is also convenient to employ the calcium salt, e.g. calcium chloride, in the form of an about 35% by weight solution, and the alkali metal hydroxide, e.g. sodium hydroxide solution, in a concentration of about 25% by weight.

The present invention provides more especially a process for making dicalcium phosphate dihydrate from a calcium compound, phosphoric acid and/or a phosphoric acid salt and optionally a basic compound in the presence of water, wherein, in order to obtain a given grain size or a desired degree of grain size distribution, at least the feed components influencing the pH-value of the resulting reaction mixture are reacted by being mixed concurrently with one another and in a quantitative ratio so as to obtain and maintain a certain pH-value or pH-range of about 2.0 to 6.0, preferably 2.5 to 5.0, the reaction being carried out at a higher pH-value within the range specified above when smaller grain sizes are to be produced. The feed components are preferably used in the form of corresponding solutions which are rapidly and intimately mixed with each other in a reaction zone, if desired in the presence of a supplementary proportion of water, the feed rate of the pH-determining solutions being regulated so as to maintain the desired pH-range indicated above during the precipitating reaction. For producing $CaHPO_4.2H_2O$ containing a predominant proportion of granular matter having a grain size of about 5 to 40µ, the phosphate is precipitated at a pH-value of about 3. For making $CaHPO_4.2H_2O$ containing granular matter with a grain size smaller than 15µ, the phosphate is precipitated at a pH-value of about 5.

In continuous operation, the individual components are introduced concurrently into the reaction mixture in proportions varying by at most about ±15% from the stoichiometric proportions, related to the general theoretical ion-equation:

$$3H^+ + PO_4^{---} + Ca^{++} + 2OH^- \rightarrow CaHPO_4.2H_2O$$

In discontinuous operation, the feed products of neutral reaction are first introduced into the reaction zone.

Calcium carbonate and/or calcium hydroxide in the form of an aqueous suspension can be used as the feed calcium compound, whilst the calcium salt solution is an aqueous solution of calcium chloride or calcium nitrate. The basic compound solutions are aqueous solutions of alkali metal and/or ammonium hydroxides and/or carbonates, whereas the phosphoric acid salt solutions include especially aqueous solutions of alkali metal and/or ammonium orthophosphates.

In the process of the present invention which uses the feed products altogether in approximately stoichiometric proportions, the balance solution or suspension portion of the calcium salt and/or the basic compound which serves to adjust the pH-value of the reaction product obtained to about 6.0 to 8.0, preferably 6.5 to 7.5, is added following the addition of all the phosphoric acid and/or the phosphoric acid salt solution. The precipitate is successively filtered off and worked up in conventional manner. In discontinuous operation, the phosphoric acid and/or phosphoric acid salt solutions together with the calcium compound solution are first introduced into the reaction zone and the pH-value is finally adjusted by means of the basic compound solution alone.

For making very white $CaHPO_4.2H_2O$, the process of the present invention uses as the feed clear solutions of phosphoric acid and/or phosphoric acid salts as well as clear solutions of calcium salts and basic compounds which all have a purity greater than about 99.9% by weight, preferably greater than 99.95% by weight. The feed products may include impurifying elements, especially iron, cobalt, nickel, chromium, vanadium and manganese, but to a total extent not exceeding about 0.1% by weight, preferably 0.01% by weight.

The feed solutions should not contain more than about 0.1% by weight colored inorganic and/or organic substances, e.g. carbon or carbon compounds.

For preparing stabilized dicalcium phosphate dihydrate, the stabilizers, which include e.g. disodium meta-silicate, disodium tetraborate, magnesium pyrophosphate, tetrasodium pyrophosphate, sodium tripolyphosphate or higher-condensed phosphates, are incorporated within the reaction zone separately or in admixture with one of the feed solutions before isolating the final product, i.e. before, during or after the reaction. The stabilizer is used in a proportion of about 0.25 to 1.5% by weight related to the dicalcium phosphate dihydrate obtained as the final product.

The reaction temperature is maintained at about 70° C. and preferably situated at about 25 to 45° C. At least one of the feed solutions can be cooled prior to being reacted down to a temperature where the feed products are just prevented from crystallizing out.

It is more especially advantageous to use the phosphoric acid in a concentration of about 85% by weight, related to $H_3PO_4$, and—if a calcium salt solution is used—to use it in a concentration of about 35% by weight, and the basic compound solution in a concentration of about 25 to 50% by weight.

For preparing dicalcium phosphate containing about 40 to 70% granular matter having a grain size greater than 40µ, the phosphoric acid and about 80 to 85% by weight of the total calcium feed used in the form of water-suspended calcium carbonate are introduced concurrently into a reaction zone with rapid and intimate mixing and in a quantitative ratio so as to maintain a pH-value of about 2 to 4, preferably 2.4 to 3.2 during such introduction. After all has been introduced and after conversion, the calcium balance portion which is in the form of a solution of a calcium salt, e.g., calcium chloride or nitrate, and the alkali metal or ammonium hydroxide, e.g., sodium hydroxide solution, are added in stoichiometric proportions related to the reaction equation:

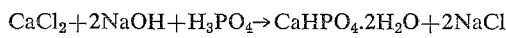

until a pH-value of about 8 to 9, preferably 8.2 to 8.6 is obtained. After all the feed has been added, the dicalcium phosphate crystallized out is separated from its mother liquor as soon as the pH-value of the reaction mixture has dropped to about 7.0 to 7.5.

During the addition e.g., of calcium chloride and sodium hydroxide solution and as soon as a pH-value of about 5 has been reached, there is added a stabilizer for the dicalcium phosphate, the stabilizer being preferably used in a proportion of about 0.6 to 0.8% by weight, related to the final product. The calcium chloride solution has a strength of about 35% by weight and the sodium hydroxide solution a strength of about 25% by weight.

If calcium carbonate is employed, the calcium carbonate suspension should preferably have a density of about 1.46. On the other hand, if calcium carbonate is used, the suspended calcium carbonate should contain 80% granular matter having a grain size greater than $60\mu$, preferably a maximum of 80% granular matter having a grain size greater than $40\mu$. The calcium carbonate should finally have an at least 97% degree of whiteness related to the MgO for use in analyses of Messrs. Merck.

The following examples serve to illustrate the invention but they are not intended to limit it thereto:

EXAMPLE 1

*Discontinuous operation.*—The feed components were a 35% by weight calcium chloride solution, a 50% by weight sodium hydroxide solution and a 85% by weight phosphoric acid (related to $H_3PO_4$). All the components had a purity greater than 99.95% and contained less than a total of 0.01% impurities including iron, chromium and manganese. The calcium chloride solution and the sodium hydroxide solution were used in stoichiometric proportions and introduced into a 120-liter stainless steel reactor provided with a cooling means and a high speed propeller stirrer (1450 r.p.m.). 40 liters water had first been introduced into the reactor so as to ensure thorough mixing of the components from the start of the reaction. The phosphoric acid was added so as to reduce the pH of the reaction suspension from an initial value of 6–7 within a period amounting to 12% of the introduction time, related to the whole reaction time, to a value of 3, i.e., so as to obtain 12% of the dicalcium phosphate dihydrate, related to the total amount to be formed, at a pH-value greater than 3. The reaction temperature rose from initially 14° C. to 55° C. After final adjustment of the pH-value to 7.5 by adding the balance portion of the sodium hydroxide and calcium chloride solutions, a dissolved stabilizer was incorporated, and the suspension was filtered. The filter cake, which contained 30% adhering water and a residual chloride proportion smaller than 0.05%, was dried in conventional manner. The dicalcium phosphate dihydrate so produced contained 70% granular matter having a grain size smaller than $40\mu$.

EXAMPLE 2

*Discontinuous operation.*—The procedure and conditions were the same as set forth in Example 1, but the pH of the reaction suspension was adjusted to a value of 3 after a period amounting to 45% of the introduction time, related to the whole reaction time, so as to obtain 45% of the total dicalcium phosphate at a pH-value greater than 3. The dicalcium phosphate so produced consisted of 100% granular matter having a grain size smaller than $40\mu$. The degree of grain size distribution in the product was as follows: 26% smaller than $5\mu$; 54%=$5-15\mu$; 20%=$15-40\mu$.

EXAMPLE 3

*Discontinuous operation.*—The procedure and conditions were the same as those described in Example 1, but the pH of the reaction suspension was adjusted to a value of 3 after a period amounting to 55% of the introduction time, related to the whole reaction time, so as to obtain 55% of the resulting total dicalcium phosphate at a pH-value greater than 3. The dicalcium phosphate so produced consisted to 100% of grains having a size smaller than $40\mu$. Grain size distribution in the product was as follows: 35% smaller than $5\mu$; 57%=$5-15\mu$; 8%=$15-40\mu$.

EXAMPLE 4

*Discontinuous operation.*—The feed components were an aqueous calcium carbonate suspension containing 50% solid matter and a 85% by weight phosphoric acid (related to $H_3PO_4$) which were used in stoichiometric proportions. The reactor provided with a stirrer was the same as that used in Example 1 and it was charged with the same amount of water as indicated in that example. The two feed components were introduced concurrently, and th phosphoric acid served to maintain a constant pH-value of 3.5 (±0.2) during the reaction. The reaction temperature rose from 20 to 30° C. Final adjustment of the pH-value, stabilization, filtration and drying took place in the manner set forth in Example 1. The dicalcium phosphate dihydrate so produced contained but 50° granular matter having a grain size smaller than $40\mu$.

EXAMPLE 5

*Discontinuous operation.*—The procedure and conditions were the same as those set forth in Example 4, but the carbonate was replaced with calcium hydroxide, and the PH of the reaction suspension was maintained at a constant value of 2.5 (±0.2) during the reaction. The reaction temperature rose from 14 to 55° C. The resulting product contained but 25% granular matter having a grain size smaller than $40\mu$.

EXAMPLE 6

*Continuous operation.*—The feed components were the same as those used in Example 1. The calcium chloride solution and the sodium hydroxide solution were introduced substantially in stoichiometric proportions with dosing pumps into the reactor previously charged with the reaction suspension. The phosphoric acid was added so as to obtain a pH-value of the reaction suspension varying between the narrow limits of 2.3 to 2.7 with merely very short-time variations from the mean value of 2.5. An overflow device served to maintain a given filling level in the reactor and to withdraw newly formed reaction suspension. The reaction temperature was limited to 40–50° C. by external cooling. The overflow reaction suspension was conveyed to a second reactor provided with a stirrer; the balance portions of the calcium chloride and sodium hydroxide solutions were added to adjust a pH-value of 7.5, and a stabilizer solution was added concurrently therewith. The overflow device disposed at the second reactor served to convey the finished dicalcium phosphate suspension to a filter press. Washing and drying took place in customary manner. The dicalcium phosphate dihydrate so produced contained 70% granular matter having a grain size smaller than $40\mu$.

EXAMPLE 7

*Continuous operation.*—The procedure and conditions were the same as those used in Example 6, but the pH-value of the reaction suspension was allowed to vary within the limits of 4.5 to 4.7 with merely very short-time variations from the mean value of 4.6. The resulting dicalcium phosphate consisted to 100% of granular matter having a grain size smaller than $40\mu$. Grain size distribution in the product was as follows: 40% smaller than $5\mu$; 57%=$5-15\mu$; 3%=$15-30\mu$.

EXAMPLE 8

A stainless steel reactor having a capacity of 1 cubic meter and provided with a high-speed propeller stirrer (1500 r.p.m.) was charged with 220 liters water. 100 kg. $CaCO_3$ were suspended in water concurrently therewith in a second stainless steel recipient; the $CaCO_3$-suspension had a density of about 1.46. In a first step, the carbonate suspension and a 78% phosphoric acid were pumped concurrently into the reactor. The phosphoric acid feed was regulated by means of a regulating valve so as to obtain a pH-varying between 2.4–2.6. As soon as the total carbonate quantity had undergone reaction, the pH-value was finally adjusted in a second step by reacting the excess phosphoric acid with calcium chloride (35% strength) and sodium hydroxide solution (25% strength) in stoichiometric proportions. The temperature in the reactor rose from initially 25–30° C. (first step) to 40–45° C. Stabilization took place at a pH-value of 4–5 by incorporating 0.6–0.8% by weight tetrasodium pyrophosphate, related to the final product to be prepared. The supply of $CaCl_2$ and NaOH was arrested after a pH-value of 8.2–8.6 had been reached.

The finished dicalcium phosphate was filtered off with the use of a vacuum drum filter and washed. The filter cake containing about 40% adhering water was dried in a fluidized bed drying apparatus and ultimately ground in a sorter mill so as to contain 99% granular matter having a grain size smaller than $40\mu$. This grain size was necessary for specific application of the product.

EXAMPLE 9

*Discontinuous operation.*—The feed substances were a 35% by weight calcium chloride solution, a 50% by weight sodium hydroxide solution and a 85% by weight phosphoric acid (related to $H_3PO_4$). The compounds had a purity greater than 99.95% and contained not more than a total of 0.01% impurities including iron, chromium and manganese. The calcium chloride solution and the sodium hydroxide solution were introduced in stoichiometric proportions into a stainless steel reactor having a capacity of 120 liters and provided with a cooling means and a propeller stirrer (1450 r.p.m.). 40 liters water had first been introduced into the reactor so as to ensure thorough mixing from the start of the reaction. The phosphoric acid was supplied so as to obtain a pH-value of 3.0 to 3.5 during the reaction and so as to finally obtain a pH-value of 7.0. The reaction temperature rose from 14 to 43° C. After the addition of a dissolved stabilizer, the precipitate obtained was filtered and washed on a rotating filter. The resulting filter cake, which contained 40% adhering water and had a residual chloride content smaller than 0.01%, was dried in conventional manner and ground. The final product had a 99.5% degree of whiteness.

EXAMPLE 10

*Discontinuous operation.*—The procedure and conditions were the same as those set forth in Example 9 with the exception that a corresponding quantity of finished reaction suspension coming from a previous batch was used to replace the 40 liters water.

EXAMPLE 11

*Discontinuous operation.*—The procedure and conditions were the same as those set forth in Example 9 with the exception that the water was replaced with an about 15% calcium chloride solution which was used in a stoichiometric proportion.

EXAMPLE 12

*Discontinuous operation.*—The reaction was carried out under the same conditions as those set forth in Example 9 with the exception that feed products pre-cooled at a temperature of about 0° C. served as cooling means during the reaction, the final reaction temperature amounting to 48° C.

EXAMPLE 13

*Discontinuous operation.*—The procedure and conditions were the same as those set forth in Example 9, but a $Na_4P_2O_7$-stabilizer had been dissolved in the water first introduced into the reactor.

EXAMPLE 14

*Discontinuous operation.*—The procedure and conditions were the same as those set forth in Example 9, but $Na_5P_3O_{10}$ in powder form was added as a stabilizer to the reaction mixture before finally adjusting the pH-value to 7.5.

EXAMPLE 15

*Discontinuous operation.*—The procedure and conditions were the same as those set forth in Example 14, but the stabilizer was added after pH-adjustment to 8.

EXAMPLE 16

*Discontinuous operation.*—The procedure and conditions were the same as those set forth in Example 9, but 75% of the phosphoric acid was replaced with an equivalent amount of a monosidum tripolyphosphate solution.

EXAMPLE 17

*Continuous operation.*—The feed products were the same as those used in Example 9. The calcium chloride solution and the sodium hydroxide solution were introduced in substantially stoichiometric proportions with the help of dosing pumps into the reactor which had previously been charged with reaction suspension (cf. Example 10). The phosphoric acid was supplied so as to obtain a pH-value varying within the limits of 2.7 to 4.7. An overflow device served to maintain a given filling level in the reactor and to withdraw newly formed reaction suspension. The reaction temperature was limited to 40–50° C. by external cooling. The overflow reaction suspension was conveyed to a second reactor provided with a stirrer but having no cooling means. The balance portions of the calcium chloride and sodium hydroxide solutions were added so as to adjust a pH-value of 7.5, and the stabilizer solution was incorporated concurrently therewith. The overflow device disposed at the second reactor conveyed the finished dicalcium phosphate suspension to a filter press. Washing, drying and grinding took place in conventional manner. The final product had a 99.3% degree of whiteness.

EXAMPLE 18

*Continuous operation.*—The procedure was the same as set forth in Example 17, but the calcium chloride solution and the diluting water of 100 liter per 100 kg. $CaHPO_4 \cdot 2H_2O$ had been cooled at a temperature of about 0° C.

EXAMPLE 19

*Continuous operation.*—The reaction was carried out in a manner analogous to that described in Example 17 with the exception that the calcium chloride solution was added in stoichiometric proportions to the phosphoric acid, so that the sodium hydroxide solution alone served to adjust a pH-value of 8 in the second reactor.

EXAMPLE 20

*Continuous operation.*—The procedure was the same as that set forth in Example 17, but a stabilizer had been dissolved in the phosphoric acid before the acid was added.

EXAMPLE 21

*Continuous operation.*—The procedure and conditions were the same as those set forth in Example 17, but the feed products were a 50% by weight calcium nitrate solution, a 30% by weight ammonia and a 85% by weight phosphoric acid.

What is claimed is:

1. In the process for the manufacture of dicalcium phosphate dihydrate by reacting feed compounds comprising (a) at least one calcium salt selected from the group consisting of aqueous calcium hydroxide, aqueous calcium carbonate, aqueous calcium chloride and aqueous calcium nitrate, (b) at least one phosphoric acid compound selected from the group consisting of phosphoric acid, aqueous alkali metal phosphate and aqueous ammonium phosphate and (c) when the calcium salt (a) is a member selected from the group consisting of calcium chloride and calcium nitrate, at least one basic compound selected from the group consisting of alkali metal and ammonium hydroxides and carbonates in the presence of water at a temperature below 70° C., the improvement which comprises simultaneously introducing into a reaction zone the calcium salt and the phosphoric acid compound to form a reaction mixture, reacting the calcium salt and the phosphoric acid compound by rapidly and intimately mixing them, adjusting the reaction mixture to a pH-value within the range of 2.0 and 6.0 and maintaining the pH-value during substantially the entire reaction by supplying the feed compounds such that the pH-value is maintained, whereby a higher pH-value within the pH-range produces dicalcium phosphate dihydrate having a smaller grain size and a lower pH-value within the pH-range produces dicalcium phosphate dihydrate having a larger grain size, after all of said phosphoric acid compound has been introduced, adding the balance of the feed compounds other than the phosphoric acid compound while increasing the pH-value adjusted and separating the dicalcium phosphate dihydrate from liquid matter accompanying it.

2. A process as claimed in claim 1, wherein the dicalcium phosphate dihydrate is precipitated at a pH-value of about 3 so as to produce $CaHPO_4.2H_2O$ containing a predominant proportion of granular matter having a grain size within the range of 5 to 40μ.

3. A process as claimed in claim 1, wherein the dicalcium phosphate dihydrate is precipitated at a pH-value of about 5 so as to produce $CaHPO_4.2H_2O$ consisting substantially of granular matter having a grain size smaller than 15μ.

4. A process as claimed in claim 1, wherein dicalcium phosphate dihydrate containing about 40 to 70% granular matter having a grain size greater than 40μ is produced by flowing the phosphoric acid and about 80 to 85% by weight of the total amount of feed calcium in the form of water-suspended calcium carbonate concurrently into the reaction zone with rapid and intimate mixing and in quantitative proportions so as to maintain a pH-value of about 2 to 4 during such introduction, and adding after such introduction and after reaction, the remaining calcium salt in the form of a calcium salt solution and a liquor in stoichiometric proportions, related to the reaction equation:

$$Ca^{++} + 2OH^- + H_3PO_4 \rightarrow CaHPO_4.2H_2O$$

until a pH-value of about 8 to 9 is obtained and isolating crystallized dicalcium phosphate dihydrate from its mother liquor after all has been added and as soon as the pH of the reaction mixture has dropped to a value of about 7.0 to 7.5.

5. A process as claimed in claim 4, wherein, during the addition of the calcium salt and the liquor, a stabilizer for the dicalcium phosphate dihydrate is added in a proportion of about 0.6 to 0.8% by weight, related to the final product, as soon as a pH-value of about 5 has been reached.

6. A process as claimed in claim 1, wherein a calcium carbonate suspension having a density of about 1.46 is used.

7. A process as claimed in claim 1, wherein calcium carbonate suspension is used containing at most 80% granular matter having a grain size greater than 60μ.

8. A process as claimed in claim 1, wherein a calcium carbonate solution is used, the calcium carbonate having an at least 97% degree of whiteness, related to MgO as used for analyses of Messrs. Merck.

9. A process as claimed in claim 1, wherein all the reaction compounds have a purity greater than 99.9% by weight and contain not more than a total of 0.1% by weight of iron, cobalt, chromium, vanadium and manganese, and less than 0.1% by weight colored inorganic and organic substances, respectively.

10. A process as claimed in claim 9, wherein the phosphoric acid is used in a concentration of about 85% by weight, related to $H_3PO_4$, the calcium salt solution is used in a concentration of about 35% by weight, and the basic compound is used in a solution having a concentration of about 25 to 50% by weight.

References Cited by the Examiner

UNITED STATES PATENTS

| | | | |
|---|---|---|---|
| 2,078,627 | 4/1937 | Block et al. | 23—109 |
| 2,287,699 | 6/1942 | Moss et al. | 23—109 |
| 2,946,656 | 7/1960 | Scheurs | 23—109 |
| 3,012,852 | 12/1961 | Nelson | 23—109 |
| 3,065,053 | 11/1962 | Aia | 23—109 |
| 3,068,067 | 12/1962 | Aia | 23—109 |
| 3,095,269 | 6/1963 | Chiola et al. | 23—109 |

FOREIGN PATENTS

| | | |
|---|---|---|
| 623,980 | 2/1963 | Belgium. |
| 782,177 | 9/1957 | Great Britain. |

OTHER REFERENCES

Aia et al.: "Precipitating Stoichiometric $CaHPO_4.2H_2O$,"

Industrial and Engineering Chemistry, January 1961, volume 53, No. 1, pages 55–57.

Comstock et al.: "Precipitation of Calcium Hydrogen Orthophosphate," Industrial and Engineering Chemistry, March 1959, volume 51, No. 3, pages 325–328.

OSCAR R. VERTIZ, *Primary Examiner.*

MILTON WEISSMAN, O. F. CRUTCHFIELD,
*Assistant Examiners.*